(12) United States Patent
Tu

(10) Patent No.: US 11,250,230 B2
(45) Date of Patent: Feb. 15, 2022

(54) NARROW-STRIP 2-DIMENSIONAL BAR CODES, METHODS, APPARATUSES, AND DEVICES FOR GENERATING AND IDENTIFYING NARROW-STRIP 2-DIMENSIONAL BAR CODES

(71) Applicant: Advanced New Technologies Co., Ltd., Grand Cayman (KY)

(72) Inventor: Yinhai Tu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/244,691

(22) Filed: Apr. 29, 2021

(65) Prior Publication Data
US 2021/0248337 A1     Aug. 12, 2021

Related U.S. Application Data

(63) Continuation of application No. PCT/CN2020/070641, filed on Jan. 7, 2020.

(30) Foreign Application Priority Data

Mar. 18, 2019  (CN) .......................... 201910205310.X

(51) Int. Cl.
*G06K 7/14* (2006.01)
*G06K 19/06* (2006.01)

(52) U.S. Cl.
CPC ......... *G06K 7/1417* (2013.01); *G06K 7/1443* (2013.01); *G06K 19/06037* (2013.01)

(58) Field of Classification Search
CPC ........... G06K 7/1417; G06K 19/06037; G06K 7/1443
See application file for complete search history.

(56) References Cited

U.S. PATENT DOCUMENTS

| 5,686,718 A | 11/1997 | Iwai et al. |
| 9,892,300 B2 | 2/2018 | Hosokane |

(Continued)

FOREIGN PATENT DOCUMENTS

| CN | 1801188 | 7/2006 |
| CN | 101430768 | 5/2009 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Matthew Mikels
(74) *Attorney, Agent, or Firm* — Fish & Richardson P.C.

(57) ABSTRACT

Disclosed herein are methods, systems, and apparatus, including computer programs encoded on computer storage media, for identifying a narrow-strip two-dimensional bar code. One of the methods includes obtaining an image of the narrow-strip two-dimensional bar code. A first positioning graph and a second positioning graph are detected in the image. A target region is determined from the image based on center positions of the first positioning graph and the second positioning graph, where the target region includes a rectangular region corresponding to the narrow-strip two-dimensional bar code. A data region is determined from the target region, and two-dimensional bar code data is determined from the data region.

20 Claims, 6 Drawing Sheets

(56) References Cited

U.S. PATENT DOCUMENTS

2006/0043189 A1* 3/2006 Agrawal ................. G06K 7/14
235/462.08
2015/0347886 A1* 12/2015 Fang ................ G06K 19/06037
235/462.04

FOREIGN PATENT DOCUMENTS

| CN | 108875874 | 11/2018 |
|---|---|---|
| CN | 108960000 | 12/2018 |
| CN | 109325381 | 2/2019 |
| CN | 109657513 | 4/2019 |
| CN | 110033065 | 7/2019 |
| EP | 3467715 | 4/2019 |
| JP | 2000276564 | 10/2000 |
| KR | 20180120863 | 11/2018 |
| TW | 201604789 | 2/2016 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/070641, dated Mar. 25, 2020, 10 pages (with partial English translation).
Extended European Search Report in European Application No. 20773181.1, dated Nov. 12, 2021, 10 pages.

\* cited by examiner

NARROW-STRIP 2-DIMENSIONAL BAR CODES, METHODS, APPARATUSES, AND DEVICES FOR GENERATING AND IDENTIFYING NARROW-STRIP 2-DIMENSIONAL BAR CODES

CROSS-REFERENCE TO RELATED APPLICATIONS

This application is a continuation of PCT Application No. PCT/CN2020/070641, filed on Jan. 7, 2020, which claims priority to Chinese Patent Application No. 201910205310.X, filed on Mar. 18, 2019. Each application is hereby incorporated by reference in its entirety.

TECHNICAL FIELD

One or more embodiments of the present specification relate to the field of image processing technologies, and in particular, to narrow-strip 2-dimensional bar codes and methods, apparatuses, and devices for generating and identifying narrow-strip 2-dimensional bar codes.

BACKGROUND

A 2-dimensional bar code is a barcode that records information by using graphs distributed in a 2-dimensional direction of a plane based on a specific rule. Quick Response 2-dimensional bar codes (QR codes for short) are most common. Conventional QR codes typically provide three large pile-point structures for positioning. In a binary 2-dimensional bar code, a black-and-white length ratio of a line segment of the large pile-point structure satisfies 1:1:3:1:1. However, in some scenarios, for example, when the 2-dimensional bar code is used to record information related to a book number, because space used to post the 2-dimensional bar code is relatively small, a conventional 2-dimensional bar code is not easy to use.

Therefore, a 2-dimensional bar code needs to be generated, so as to facilitate use when use space is relatively small.

SUMMARY

One or more embodiments of the present specification describe narrow-strip 2-dimensional bar codes and methods, apparatuses, and devices for generating and identifying narrow-strip 2-dimensional bar codes, so as to generate a small 2-dimensional bar code, which can be conveniently used when space is relatively small.

According to a first aspect, a method for generating a narrow-strip 2-dimensional bar code is provided, including the following: a rectangular region is determined, where the rectangular region includes blocks to be filled and arranged in a grid shape; two square regions at two vertices in the rectangular region are separately filled with two positioning graphs, where each positioning graph includes a central square structure formed by a first color block, and an enclosure structure formed by second color blocks and surrounding the square structure by one round; for each positioning graph in the rectangular region, a region surrounding the positioning graph is filled with first color blocks, to form a corresponding isolation region; and a data region is filled with a first color block and a second color block that are corresponding to 2-dimensional bar code data, where the data region is a region in the rectangular region excluding the two positioning graphs and corresponding isolation regions.

According to a second aspect, a method for identifying a narrow-strip 2-dimensional bar code is provided, including the following: an image of a narrow-strip 2-dimensional bar code is obtained; a positioning graph in the image is detected, where the positioning graph includes a central square structure formed by a first color block, and an enclosure structure formed by second color blocks and surrounding the square structure by one round, and where the positioning graph has an isolation region formed by first color blocks at the periphery; when the two positioning graphs are detected, a target region that includes a rectangular region corresponding to the narrow-strip 2-dimensional bar code is determined from the image and based on center positions of the two positioning graphs; a data region to be identified is determined from the target region; and 2-dimensional bar code data of the data region is identified.

According to a third aspect, a narrow-strip 2-dimensional bar code is provided, including: two positioning graphs, where the two positioning graphs are located at two vertices of a rectangular region, each positioning graph includes a central square structure formed by a first color block, and an enclosure structure formed by second color blocks and surrounding the square structure by one round; two isolation regions, each of which is formed by first color blocks, in the rectangular region, surrounding one of the positioning graphs; and a data region, used to form 2-dimensional bar code data and including a region in the rectangular region excluding the two positioning graphs and corresponding isolation regions.

According to a fourth aspect, an apparatus for generating a narrow-strip 2-dimensional bar code is provided, including: a determining unit, configured to determine a rectangular region, where the rectangular region includes blocks to be filled and arranged in a grid shape; and a filling unit, configured to separately fill, with two positioning graphs, two square regions at two vertices in the rectangular region determined by the determining unit, where each positioning graph includes a central square structure formed by a first color block, and an enclosure structure formed by second color blocks and surrounding the square structure by one round; the filling unit is further configured to: for each positioning graph in the rectangular region determined by the determining unit, fill a region surrounding the positioning graph with first color blocks, to form a corresponding isolation region; and the filling unit is further configured to fill a data region with a first color block and a second color block that are corresponding to 2-dimensional bar code data, where the data region is a region in the rectangular region excluding the two positioning graphs and corresponding isolation regions.

According to a fifth aspect, an apparatus for identifying a narrow-strip 2-dimensional bar code is provided, including: an acquisition unit, configured to obtain an image of a narrow-strip 2-dimensional bar code; a detection unit, configured to detect a positioning graph in the image obtained by the acquisition unit, where the positioning graph includes a central square structure formed by a first color block, and an enclosure structure formed by second color blocks and surrounding the square structure by one round, and where the positioning graph has an isolation region formed by first color blocks at the periphery; a determining unit, configured to: when the detection unit detects the two positioning graphs, determine, from the image and based on center positions of the two positioning graphs, a target region that includes a rectangular region corresponding to the narrow-strip 2-dimensional bar code; where the determining unit is further configured to determine a data region to be identified from the target region; and an identification unit, configured to identify 2-dimensional bar code data of the data region determined by the determining unit.

According to a sixth aspect, a device for generating a narrow-strip 2-dimensional bar code is provided, including: a memory; one or more processors; and one or more programs, where the one or more programs are stored in the memory and configured to be executed by the one or more processors, the program being executed by the processor to implement the following steps: determining a rectangular region, where the rectangular region includes blocks to be filled and arranged in a grid shape; separately filling two square regions at two vertices in the rectangular region with two positioning graphs, where each positioning graph includes a central square structure formed by a first color block, and an enclosure structure formed by second color blocks and surrounding the square structure by one round; for each positioning graph in the rectangular region, filling a region surrounding the positioning graph with first color blocks, to form a corresponding isolation region; and filling a data region with a first color block and a second color block that are corresponding to 2-dimensional bar code data, where the data region is a region in the rectangular region excluding the two positioning graphs and corresponding isolation regions.

According to a seventh aspect, a device for identifying a narrow-strip 2-dimensional bar code is provided, including: a memory; one or more processors; and one or more programs, where the one or more programs are stored in the memory and configured to be executed by the one or more processors, the program being executed by the processor to implement the following steps: obtaining an image of a narrow-strip 2-dimensional bar code; detecting a positioning graph in the image, where the positioning graph includes a central square structure formed by a first color block, and an enclosure structure formed by second color blocks and surrounding the square structure by one round, and where the positioning graph has an isolation region formed by first color blocks at the periphery; when the two positioning graphs are detected, determining, from the image and based on center positions of the two positioning graphs, a target region that includes a rectangular region corresponding to the narrow-strip 2-dimensional bar code; determining a data region to be identified from the target region; and identifying 2-dimensional bar code data of the data region.

One or more embodiments of the present specification provide a narrow-strip 2-dimensional bar code and a method, an apparatus, and a device for generating and identifying a narrow-strip 2-dimensional bar code. The method includes: determining a rectangular region, where the rectangular region includes blocks to be filled and arranged in a grid shape; separately filling two square regions at two vertices in the rectangular region with two positioning graphs, where each positioning graph includes a central square structure formed by a first color block, and an enclosure structure formed by second color blocks and surrounding the square structure by one round; for each positioning graph in the rectangular region, filling a region surrounding the positioning graph with first color blocks, to form a corresponding isolation region; and filling a data region with a first color block and a second color block that are corresponding to 2-dimensional bar code data, where the data region is a region in the rectangular region excluding the two positioning graphs and corresponding isolation regions. It can be understood that the narrow-strip 2-dimensional bar code generated in the present specification can include only two positioning graphs, so the area of the narrow-strip 2-dimensional bar code can be greatly reduced, facilitating use when space is relatively small.

BRIEF DESCRIPTION OF DRAWINGS

To describe the technical solutions in the embodiments of the present specification more clearly, the following briefly describes the accompanying drawings needed for describing the embodiments. Clearly, the accompanying drawings in the following description show merely some embodiments of the present specification, and a person of ordinary skill in the art can still derive other drawings from these accompanying drawings without creative efforts.

DESCRIPTION OF EMBODIMENTS

The following describes the solutions provided in the present specification with reference to the accompanying drawings.

Figure 1:
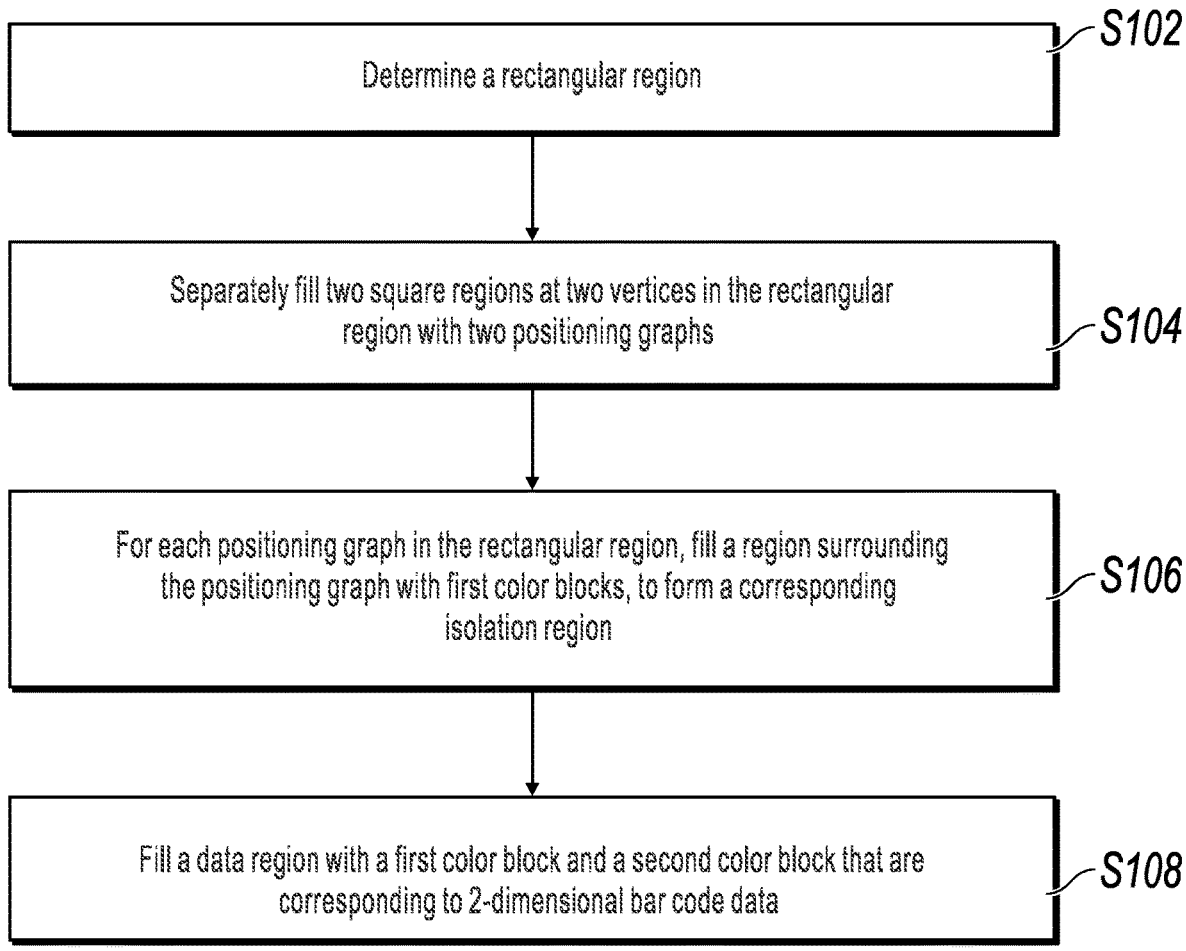
FIG. 1 is a flowchart illustrating an example of a method for generating a narrow-strip 2-dimensional bar code, according to some embodiments of the present specification.

FIG. 1 is a flowchart illustrating an example of a method for generating a narrow-strip 2-dimensional bar code, according to some embodiments of the present specification. The method can be performed by a device having a processing capability, such as a server, a system, or an apparatus. As shown in FIG. 1, the method can specifically include the following steps.

Step 102: Determine a rectangular region.

The rectangular region can include blocks to be filled and arranged in a grid shape. The blocks here can correspond to several pixels. It is worthwhile to note that, in the initially determined rectangular region, pixel values of these pixels are not yet determined, so a color value of each block in the rectangular region is null.

It is worthwhile to note that a size (or an area) of the generated rectangular region can be N*M, where N is the width of the rectangular region, and M is the length of the rectangular region. In the present specification, M can be greater than N. For example, in an example, N can be 6, and M can be 23. In another example, N can be 7, and M can be 20. It is worthwhile to note that, to ensure that a subsequently generated narrow-strip 2-dimensional bar code can store enough data, the size of the rectangular region can be set to be greater than 120, that is, N*M>120.

Step 104: Separately fill two square regions at two vertices in the rectangular region with two positioning graphs.

The two vertices here can be two vertices at two ends of a diagonal line of the rectangular region, or can be two vertices at two ends of a rectangular long side of the rectangular region.

Each positioning graph can include a central square structure formed by a first color block, and an enclosure structure formed by second color blocks and surrounding the square structure by one round. The first color block here can be a white block, or can be a black block. It can be understood that when the first color block is a white block, the second color block is a black block. When the first color block is a black block, the second color block is a white block.

In addition, a width ratio of the square structure of the positioning graph and the enclosure structure can be 1:1, that is, in a horizontal direction and/or a vertical direction, a width ratio of the second color block, the first color block, and the second color block of the positioning graph can be 1:1:1.

Figure 2A:
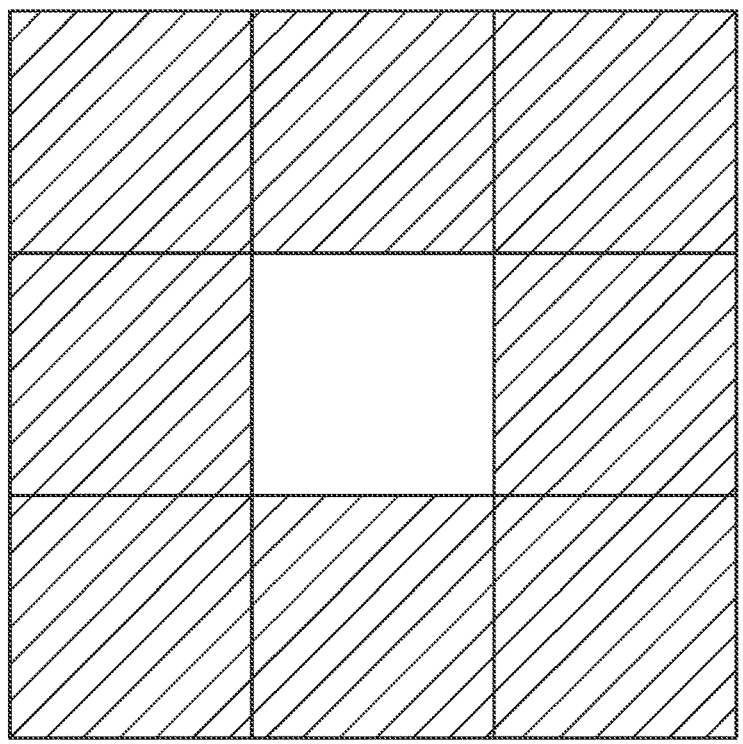
FIG. 2a is a schematic diagram illustrating an example of a positioning graph, according to some embodiments of the present specification.

In an example, the positioning graph can be shown in FIG. 2a. In FIG. 2a, the central square structure of the positioning graph includes one white block, and the enclosure structure surrounding the square structure by one round includes eight black blocks. In addition, in the horizontal and/or vertical direction, the width ratio of the black block, the white block, and the black block of the positioning graph is 1:1:1.

Figure 2B:
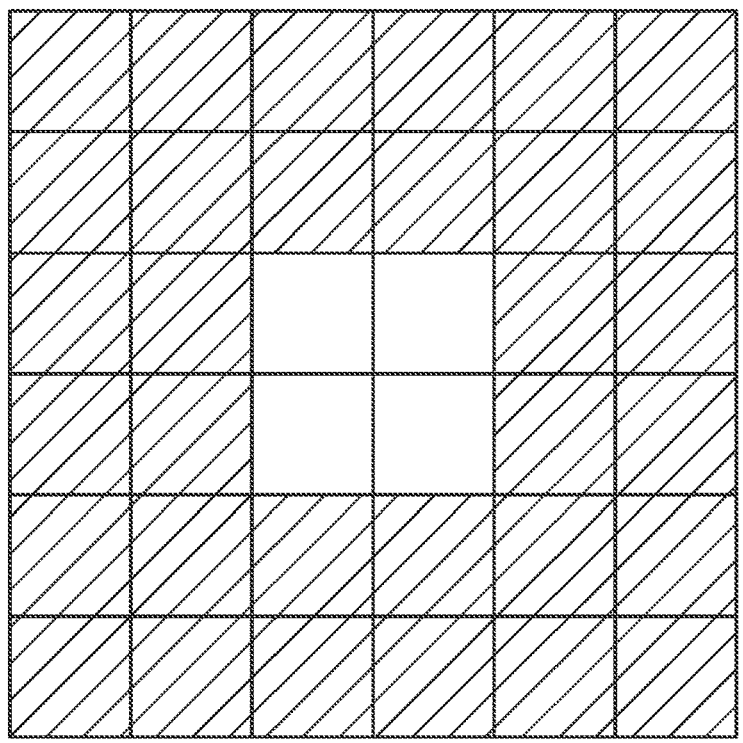
FIG. 2b is a schematic diagram illustrating another example of a positioning graph, according to some embodiments of the present specification.

In another example, the positioning graph can be shown in FIG. 2b. In FIG. 2b, the central square structure of the positioning graph includes four white blocks, and the enclosure structure surrounding the square structure by one round includes 32 black blocks. In addition, in the horizontal and/or vertical direction, the width ratio of the black block, the white block, and the black block of the positioning graph is 2:2:2, that is, the width ratio of the positioning graph is also 1:1:1.

Certainly, in practice, the white block in FIG. 2a and FIG. 2b can also be replaced with a black block, and the black block can also be replaced with a white block. This is not limited in the present specification.

It can be understood that the positioning graph in the narrow-strip 2-dimensional bar code generated in the present specification occupies smaller area than a conventional large pile-point structure. In addition, in the present specification, only two positioning graphs are generated. This can reserve more regions for a data region, that is, the narrow-strip 2-dimensional bar code can store more 2-dimensional bar code data.

Step 106: For each positioning graph in the rectangular region, fill a region surrounding the positioning graph with first color blocks, to form a corresponding isolation region.

Figure 3:
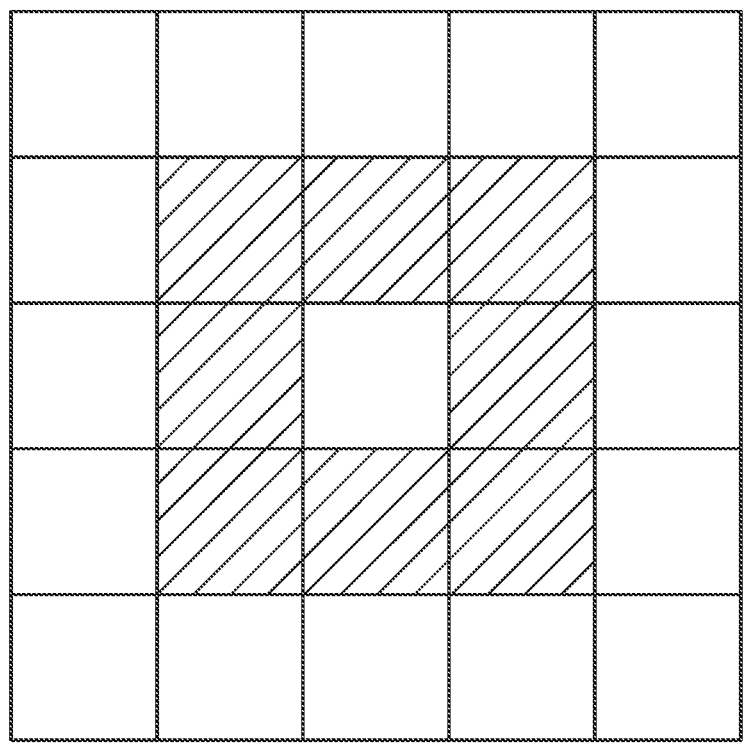
FIG. 3 is a schematic diagram illustrating an example of an isolation region of a positioning graph, according to some embodiments of the present specification.

The width of the isolation region can be the width of one block. Using the positioning graph in FIG. 2a as an example, an isolation region corresponding to the positioning graph can be shown in FIG. 3.

Step 108: Fill a data region with a first color block and a second color block that are corresponding to 2-dimensional bar code data.

The data region here can be a region in the rectangular region excluding the two positioning graphs and corresponding isolation regions.

Figure 4:
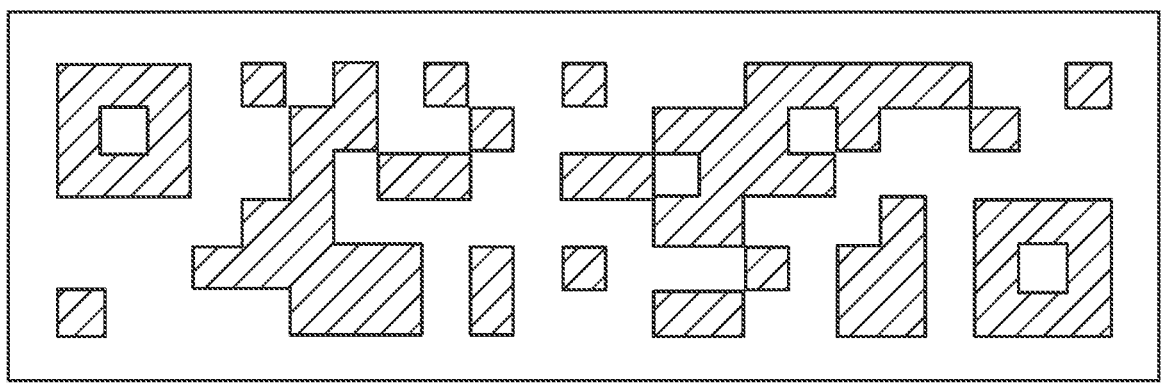
FIG. 4 is a schematic diagram illustrating an example of a narrow-strip 2-dimensional bar code, according to some embodiments of the present specification.

After the filling step is completed, a narrow-strip 2-dimensional bar code can be obtained. In an example, the generated narrow-strip 2-dimensional bar code can be shown in FIG. 4. In FIG. 4, the length of the narrow-strip 2-dimensional bar code is greater than the width thereof, and the narrow-strip 2-dimensional bar code can include: two positioning graphs, where the two positioning graphs are respectively located at two vertices on two ends of a diagonal line of a rectangular region, and each positioning graph includes a central white square formed by a white block, and a black enclosure formed by black blocks and surrounding the white square by one round. For each positioning graph, a width ratio of a black block, a white block, and a black block in a horizontal and/or vertical direction is 1:1:1. In addition, the narrow-strip 2-dimensional bar code can further include two isolation regions and a data region used to form 2-dimensional bar code data. Each isolation region is formed by white blocks surrounding one positioning graph in the rectangular region. The data region includes a region in the rectangular region excluding the two positioning graphs and corresponding isolation regions.

It is worthwhile to note that FIG. 4 shows only a shape structure of the narrow-strip 2-dimensional bar code. In another example, the two positioning graphs can also be located at vertices of the lower left corner and the upper right corner of the rectangular region, or located at two vertices at two ends of a rectangular long side of the rectangular region. In addition, the length of the narrow-strip 2-dimensional bar code can also be less than the width thereof, which is not limited in the present specification.

In summary, while a data capacity is ensured, the narrow-strip 2-dimensional bar code generated in the embodiments can occupy a relatively small area, thereby facilitating use of the narrow-strip 2-dimensional bar code when use space is relatively small.

Figure 5:
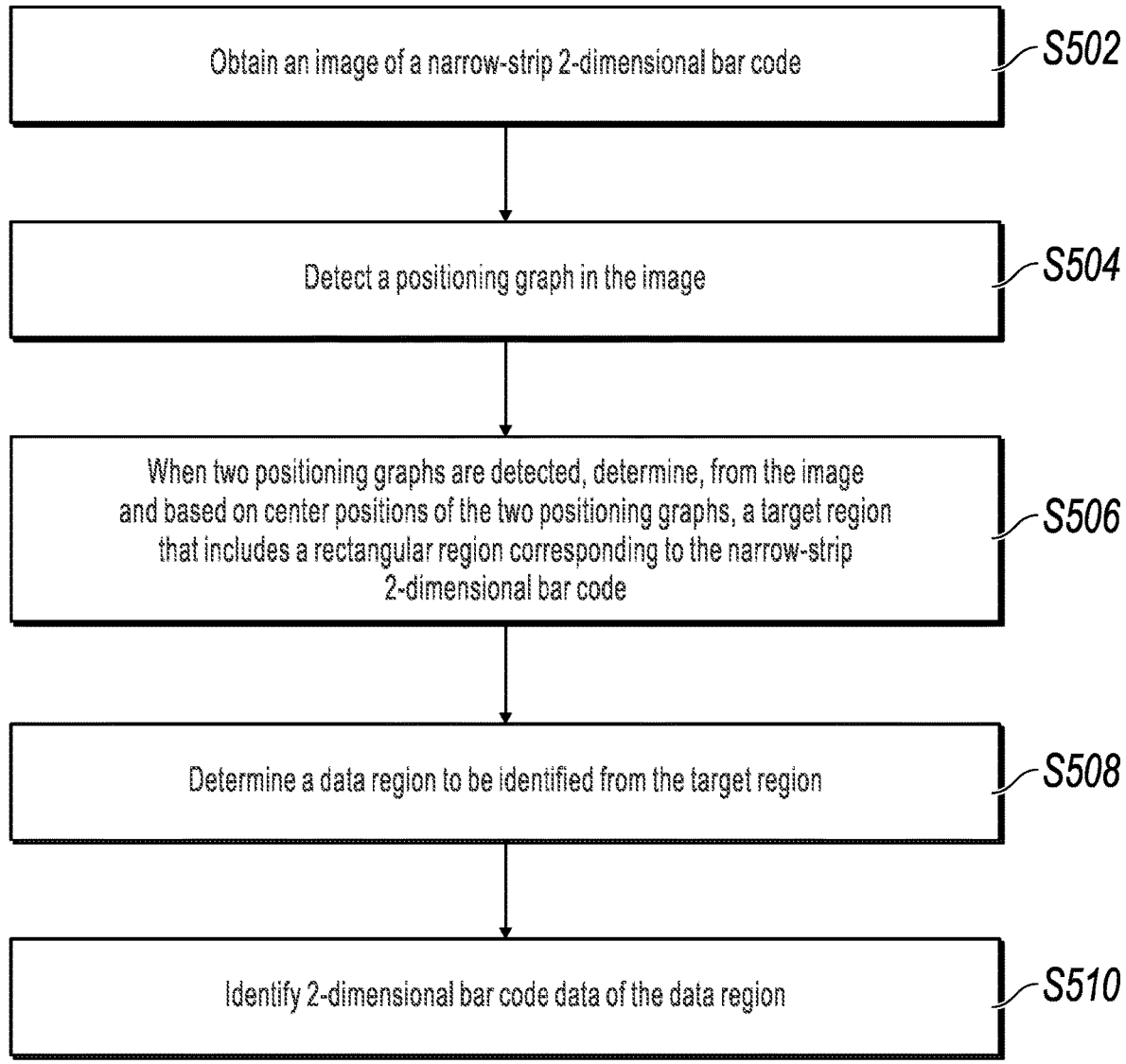
FIG. 5 is a flowchart illustrating an example of a method for identifying a narrow-strip 2-dimensional bar code, according to some embodiments of the present specification.

It is worthwhile to note that, for the generated narrow-strip 2-dimensional bar code, the present specification further provides a corresponding method for identifying the narrow-strip 2-dimensional bar code, which is specifically as follows:

FIG. 5 is a flowchart illustrating an example of a method for identifying a narrow-strip 2-dimensional bar code, according to some embodiments of the present specification. The method can be performed by a device having a processing capability, such as a server, a system, or an apparatus. As shown in FIG. 5, the method can specifically include the following steps.

Step 502: Obtain an image of a narrow-strip 2-dimensional bar code.

The narrow-strip 2-dimensional bar code here can be a 2-dimensional bar code whose length is greater than the width, or a 2-dimensional bar code whose length is less than the width.

Step 504: Detect a positioning graph in the image.

The positioning graph can include a central square structure formed by a first color block, and an enclosure structure formed by second color blocks and surrounding the square structure by one round. The positioning graph can have an isolation region formed by first color blocks at the periphery. In an example, the positioning graph and the corresponding isolation region can be shown in FIG. 3.

In addition, a width ratio of a second color block, a first color block, and a second color block of the positioning graph in a horizontal and/or vertical direction can be 1:1:1. Therefore, the positioning graph can be detected in the image based on this structural feature.

Step 506: When two positioning graphs are detected, determine, from the image and based on center positions of the two positioning graphs, a target region that includes a rectangular region corresponding to the narrow-strip 2-dimensional bar code.

Specifically, when the two positioning graphs are respectively located at two vertices at two ends of a diagonal line of the rectangular region, the determining process of the target region can be: determining, based on the center positions of the two positioning graphs, the diagonal line of the rectangular region corresponding to the narrow-strip 2-dimensional bar code; and determining, from the image and based on the diagonal line, the target region including the rectangular region.

When the two positioning graphs are respectively located at two vertices at two ends of a rectangular long side of the rectangular region, the target region can be determined based on the center positions of the two positioning graphs and another positioning graph. Another positioning graph here can be, for example, two black blocks at the lower left corner and the upper right corner of FIG. 4.

Step 508: Determine a data region to be identified from the target region.

It is worthwhile to note that the target region determined by using step 508 is only an approximate position of the narrow-strip 2-dimensional bar code in the image. To improve identification efficiency of the narrow-strip 2-dimensional bar code, the corresponding rectangular region can further be positioned in the target region. For example, a contour of the rectangular region can be extracted from the target region based on an erode algorithm. Then, the data region to be identified is determined based on the extracted contour.

In some embodiments, the process of determining the data region to be identified based on the extracted contour can be: scanning the extracted contour, and in the scanning process, repeatedly performing the following steps: selecting two points from the contour and calculating a slope of a connection line constructed by using the two points; after the extracted contour is scanned by one round, counting times of occurrence of each slope; determining a horizontal direction of the narrow-strip 2-dimensional bar code based on a slope of maximum quantity of occurrences; constructing a central connection line based on the center positions of the two positioning graphs; determining an angle of the central connection line relative to the horizontal direction; determining four vertices of the narrow-strip 2-dimensional bar code based on the center positions of the two positioning graphs and the angle; and determining the data region to be identified based on the four vertices.

Step 510: Identify 2-dimensional bar code data of the data region.

The identification process can be specifically: determining a perspective transformation relationship based on coordinates of the four determined vertices and predetermined standard code coordinates; sampling the 2-dimensional bar code data of the data region based on the perspective transformation relationship; and decoding the sampled 2-dimensional bar code data.

It is worthwhile to note that, in the method for identifying the 2-dimensional bar code provided in the embodiments of the present specification, because only two positioning graphs are detected, and the identified narrow-strip 2-dimensional bar code has a relatively small area, the solution provided in the present specification has relatively high identification efficiency.

Figure 6:
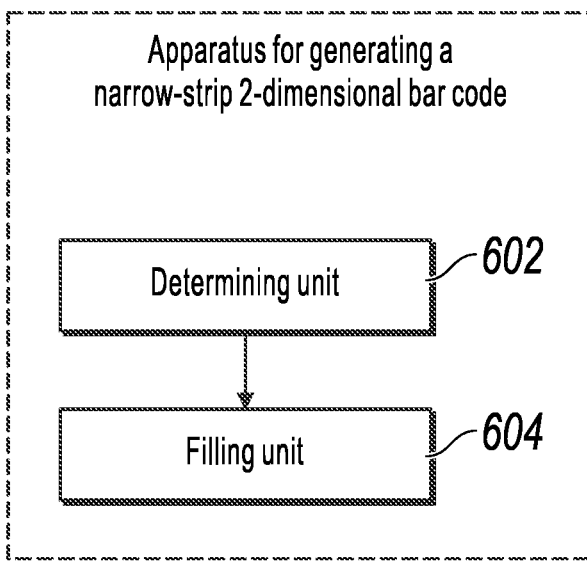
FIG. 6 is a schematic diagram illustrating an example of an apparatus for generating a narrow-strip 2-dimensional bar code, according to some embodiments of the present specification.

Corresponding to the previous method for generating a narrow-strip 2-dimensional bar code, some embodiments of the present specification further provide an apparatus for generating a narrow-strip 2-dimensional bar code. As shown in FIG. 6, the apparatus can include:

a determining unit 602, configured to determine a rectangular region, where the rectangular region includes blocks to be filled and arranged in a grid shape; and the length of the rectangular region can be greater than the width thereof; and a filling unit 604, configured to separately fill, with two positioning graphs, two square regions at two vertices in the rectangular region determined by the determining unit 602, where each positioning graph includes a central square structure formed by a first color block, and an enclosure structure formed by second color blocks and surrounding the square structure by one round.

The two vertices can be two vertices at two ends of a diagonal line of the rectangular region; or can be two vertices at two ends of a rectangular long side of the rectangular region.

The filling unit 604 is further configured to: for each positioning graph in the rectangular region determined by the determining unit 602, fill a region surrounding the positioning graph with first color blocks, to form a corresponding isolation region; and the filling unit 604 is further configured to fill a data region with a first color block and a second color block that are corresponding to 2-dimensional bar code data, where the data region is a region in the rectangular region excluding the two positioning graphs and corresponding isolation regions.

Optionally, a width ratio of the square structure and the enclosure structure is 1:1.

Functions of function modules of the previous apparatus embodiments of the present specification can be implemented by performing the steps in the previous method embodiment. A specific working process of the apparatus provided in some embodiments of the present specification is omitted here.

An apparatus for generating a narrow-strip 2-dimensional bar code provided in some embodiments of the present specification can generate a small 2-dimensional bar code, so it can be conveniently used when space is relatively small.

Figure 7:
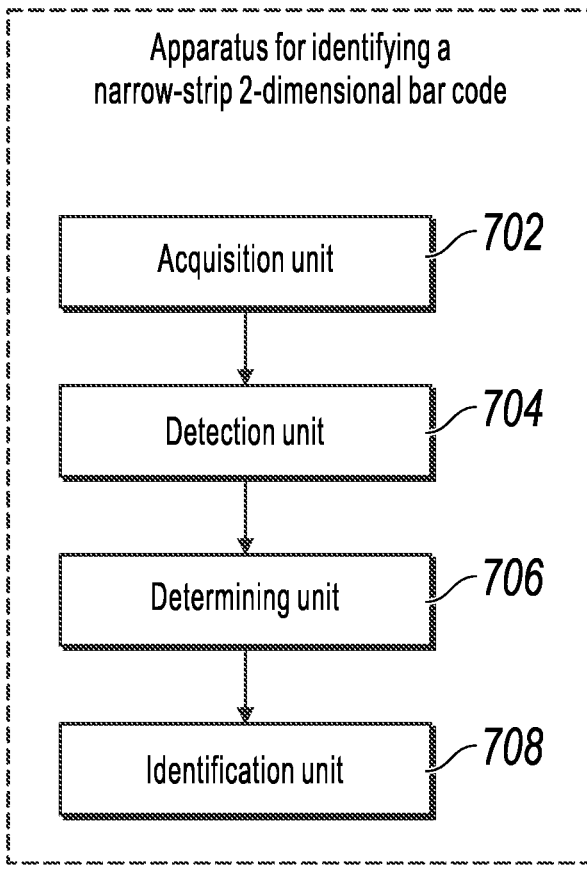
FIG. 7 is a schematic diagram illustrating an example of an apparatus for identifying a narrow-strip 2-dimensional bar code, according to some embodiments of the present specification.

Corresponding to the previous method for identifying a narrow-strip 2-dimensional bar code, some embodiments of the present specification further provide an apparatus for identifying a narrow-strip 2-dimensional bar code. As shown in FIG. 7, the apparatus can include an acquisition unit 702, a detection unit 704, a determining unit 706, and an identification unit 708.

The acquisition unit 702 is configured to obtain an image of a narrow-strip 2-dimensional bar code;

the detection unit 704 is configured to detect a positioning graph in the image obtained by the acquisition unit 702, where the positioning graph includes a central square structure formed by a first color block, and an enclosure structure formed by second color blocks and surrounding the square structure by one round, and where the positioning graph has an isolation region formed by first color blocks at the periphery;

the detection unit 704 can be specifically configured to:

detect, in the image, a positioning graph whose width ratio of the square structure and the enclosure structure is 1:1; and the determining unit 706 is configured to: when the detection unit 704 detects the two positioning graphs, determine, from the image and based on center positions of the two positioning graphs, a target region that includes a rectangular region corresponding to the narrow-strip 2-dimensional bar code.

The determining unit 706 can be specifically configured to:

determine, based on the center positions of the two positioning graphs, a diagonal line of the rectangular region corresponding to the narrow-strip 2-dimensional bar code; and determine, from the image and based on the diagonal line, the target region including the rectangular region.

The determining unit 706 is further configured to determine a data region to be identified from the target region.

The determining unit 706 can be specifically configured to:

extract a contour of the rectangular region from the target region based on an erode algorithm; and determine the data region to be identified based on the extracted contour.

The identification unit 708 is configured to identify 2-dimensional bar code data of the data region determined by the determining unit 706.

Optionally, the determining unit 706 can be further specifically configured to:

iteratively select two points from the extracted contour and calculate a slope of a connection line constructed by the two points;

after the extracted contour is scanned by one round, count times of occurrence of each slope;

determine a horizontal direction of the narrow-strip 2-dimensional bar code based on a slope of maximum quantity of occurrences;

determine four vertices of the narrow-strip 2-dimensional bar code based on the center positions of the two positioning graphs and the horizontal direction; and determine the data region to be identified based on the determined four vertices.

Optionally, the determining unit 706 can be further specifically configured to:

construct a central connection line based on the center positions of the two positioning graphs;

determine an angle of the central connection line relative to the horizontal direction;

and determine four vertices of the narrow-strip 2-dimensional bar code based on the center positions of the two positioning graphs and the angle.

An apparatus for identifying a narrow-strip 2-dimensional bar code provided in some embodiments of the present specification can quickly and accurately identify the narrow-strip 2-dimensional bar code.

Figure 8:
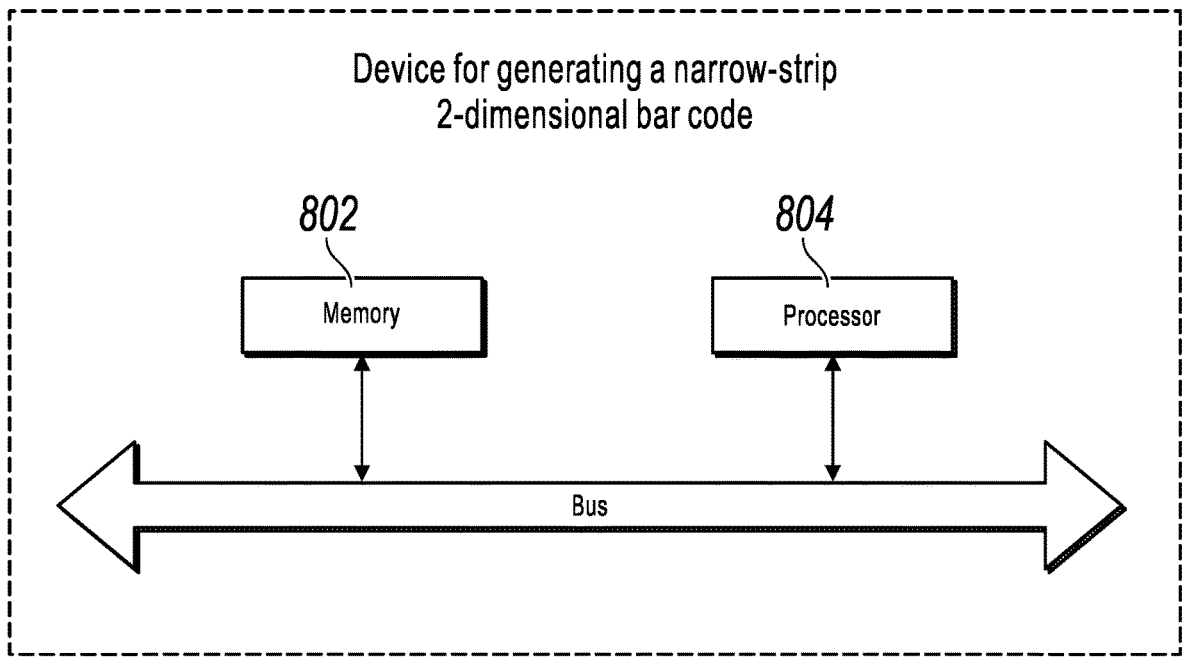
FIG. 8 is a schematic diagram illustrating an example of a device for generating a narrow-strip 2-dimensional bar code, according to some embodiments of the present specification.

Corresponding to the previous method for generating a narrow-strip 2-dimensional bar code, some embodiments of the present specification further provide a device for generating a narrow-strip 2-dimensional bar code. As shown in FIG. 8, the device can include a memory 802, one or more processors 804, and one or more programs. The one or more programs are stored in the memory 802, and are configured to be executed by the one or more processors 804. When the processor 804 executes the program, the following steps are implemented:

determining a rectangular region, where the rectangular region includes blocks to be filled and arranged in a grid shape;

separately filling two square regions at two vertices in the rectangular region with two positioning graphs, where each positioning graph includes a central square structure formed by a first color block, and an enclosure structure formed by second color blocks and surrounding the square structure by one round;

for each positioning graph in the rectangular region, filling a region surrounding the positioning graph with first color blocks, to form a corresponding isolation region; and filling a data region with a first color block and a second color block that are corresponding to 2-dimensional bar code data, where the data region is a region in the rectangular region excluding the two positioning graphs and corresponding isolation regions.

A device for generating a narrow-strip 2-dimensional bar code provided in some embodiments of the present specification can generate a small 2-dimensional bar code, which can be conveniently used by a user.

Figure 9:
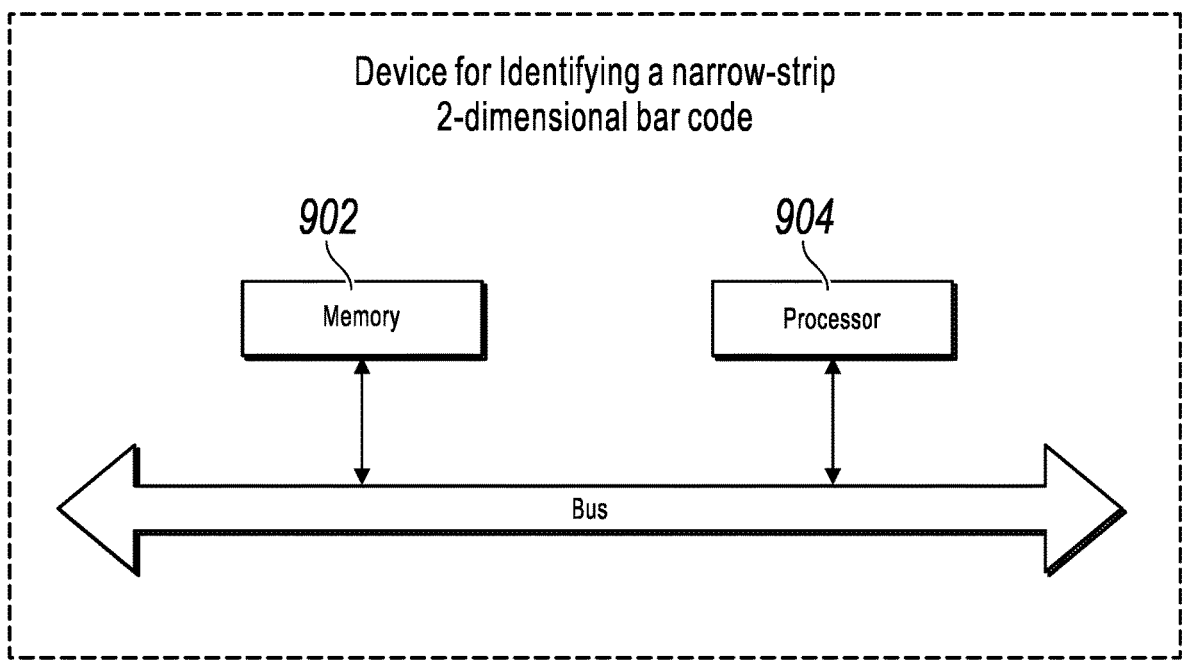
FIG. 9 is a schematic diagram illustrating an example of a device for identifying a narrow-strip 2-dimensional bar code, according to some embodiments of the present specification.

Corresponding to the previous method for identifying a narrow-strip 2-dimensional bar code, some embodiments of the present specification further provide a device for identifying a narrow-strip 2-dimensional bar code. As shown in FIG. 9, the device can include a memory 902, one or more processors 904, and one or more programs. The one or more programs are stored in the memory 902, and are configured to be executed by the one or more processors 904. When the processor 904 executes the program, the following steps are implemented:

obtaining an image of a narrow-strip 2-dimensional bar code;

detecting a positioning graph in the image, where the positioning graph includes a central square structure formed by a first color block, and an enclosure structure formed by second color blocks and surrounding the square structure by one round, and where the positioning graph has an isolation region formed by first color blocks at the periphery;

when the two positioning graphs are detected, determining, from the image and based on center positions of the two positioning graphs, a target region that includes a rectangular region corresponding to the narrow-strip 2-dimensional bar code;

determining a data region to be identified from the target region; and identifying 2-dimensional bar code data of the data region.

A device for identifying a narrow-strip 2-dimensional bar code provided in some embodiments of the present specification can quickly and accurately identify the narrow-strip 2-dimensional bar code.

The embodiments in the present specification are described in a progressive way. For same or similar parts of the embodiments, references can be made to the embodiments. Each embodiment focuses on a difference from other embodiments. Particularly, a device embodiment is similar to a method embodiment, and therefore is described briefly. For related parts, references can be made to related descriptions in the method embodiment.

The methods or algorithm steps described with reference to the content disclosed in the present specification can be implemented in a hardware method, or can be implemented in a method in which a processor executes a software instruction. The software instruction can be formed by a corresponding software module, and the software module can be stored in a RAM memory, a flash memory, a ROM memory, an EPROM memory, an EEPROM memory, a register, a hard disk, a removable hard disk, a CD-ROM, or any other form of storage medium well known in the art. An example storage medium is coupled to the processor, so the processor can read information from the storage medium and can write information to the storage medium. Certainly, the storage medium can also be a part of the processor. The processor and the storage medium can be located in an ASIC. In addition, the ASIC can be located in a server. Certainly, the processor and the storage medium can also exist in the server as separate parts.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium. The computer readable medium includes a computer storage medium and a communication medium, where the communication medium includes any medium that facilitates the transfer of a computer program from one place to another. The storage medium can be any available medium accessible to a general-purpose or dedicated computer.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or may be advantageous.

The objectives, technical solutions, and benefits of the present specification are further described in detail in the earlier-described specific implementations. It should be understood that the earlier-described descriptions are merely specific implementations of the present specification, but are not intended to limit the protection scope of the present specification. Any modification, equivalent replacement, or improvement made based on the technical solutions of the present specification shall fall within the protection scope of the present specification.

The invention claimed is:

1. A computer-implemented method, comprising:
   obtaining an image of a narrow-strip two-dimensional bar code;
   detecting a first positioning graph and a second positioning graph in the image, wherein each of the first positioning graph and the second positioning graph comprises:
      a central square structure formed by a first block of a first color, and
      an enclosure structure formed by a plurality of blocks of a second color, wherein the enclosure structure surrounds the central square structure, and
      wherein an isolation region is formed by a plurality of blocks of the first color at a periphery of each of the first positioning graph and the second positioning graph;
   after detecting the first positioning graph and the second positioning graph in the image, determining, from the image and based on center positions of the first positioning graph and the second positioning graph, a target region that comprises a rectangular region corresponding to the narrow-strip two-dimensional bar code;
   determining a data region from the target region, wherein the data region comprises a region in the rectangular region that excludes a) the first positioning graph and the second positioning graph and b) corresponding isolation regions of the first positioning graph and the second positioning graph; and
   identifying two-dimensional bar code data of the data region.

2. The computer-implemented method according to claim 1, wherein determining the data region from the target region comprises:
   extracting, as an extracted contour, a contour of the rectangular region from the target region based on an erode algorithm; and
   determining the data region based on the extracted contour.

3. The computer-implemented method according to claim 2, wherein determining the data region based on the extracted contour comprises:
   iteratively selecting two points from the extracted contour;
   calculating a slope of a connection line constructed by the two points;
   after scanning the extracted contour by one round, counting times of occurrence of each slope;
   determining a horizontal direction of the narrow-strip two-dimensional bar code based on a slope of maximum times of occurrences;
   determining four vertices of the narrow-strip two-dimensional bar code based on the center positions of the first positioning graph and the second positioning graph and the horizontal direction; and
   determining the data region based on the four vertices.

4. The computer-implemented method according to claim 3, wherein determining the four vertices of the narrow-strip two-dimensional bar code based on the center positions of the first positioning graph and the second positioning graph and the horizontal direction comprises:
   constructing a central connection line based on the center positions of the first positioning graph and the second positioning graph;
   determining an angle of the central connection line relative to the horizontal direction; and
   determining the four vertices of the narrow-strip two-dimensional bar code based on the center positions of the first positioning graph and the second positioning graph and the angle.

5. The computer-implemented method according to claim 1, wherein detecting the first positioning graph and the second positioning graph in the image comprises:
   for each of the first positioning graph and the second positioning graph, identifying, in the image, a positioning graph whose width ratio of the central square structure and the enclosure structure is 1:1.

6. The computer-implemented method according to claim 1, wherein determining, from the image and based on center positions of the first positioning graph and the second positioning graph, a target region comprises:
- determining, based on the center positions of the first positioning graph and the second positioning graph, a diagonal line of the rectangular region corresponding to the narrow-strip two-dimensional bar code; and
- determining, from the image and based on the diagonal line, the target region comprising the rectangular region.

7. The computer-implemented method according to claim 1, wherein the narrow-strip two-dimensional bar code comprises:
- the first positioning graph and the second positioning graph, wherein the first positioning graph and the second positioning graph are located at two vertices of a rectangular region;
- two isolation regions, wherein each of the two isolation regions is formed by a second plurality of blocks of the first color, in the rectangular region, surrounding one of the first positioning graph and the second positioning graph; and
- the data region, used to form two-dimensional bar code data and comprising a region in the rectangular region excluding the first positioning graph and the second positioning graph and the two isolation regions.

8. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
- obtaining an image of a narrow-strip two-dimensional bar code;
- detecting a first positioning graph and a second positioning graph in the image, wherein each of the first positioning graph and the second positioning graph comprises:
  - a central square structure formed by a first block of a first color, and
  - an enclosure structure formed by a plurality of blocks of a second color, wherein the enclosure structure surrounds the central square structure, and
  - wherein an isolation region is formed by a plurality of blocks of the first color at a periphery of each of the first positioning graph and the second positioning graph;
- after detecting the first positioning graph and the second positioning graph in the image, determining, from the image and based on center positions of the first positioning graph and the second positioning graph, a target region that comprises a rectangular region corresponding to the narrow-strip two-dimensional bar code;
- determining a data region from the target region, wherein the data region comprises a region in the rectangular region that excludes a) the first positioning graph and the second positioning graph and b) corresponding isolation regions of the first positioning graph and the second positioning graph; and
- identifying two-dimensional bar code data of the data region.

9. The computer-implemented system according to claim 8, wherein determining the data region from the target region comprises:
- extracting, as an extracted contour, a contour of the rectangular region from the target region based on an erode algorithm; and
- determining the data region based on the extracted contour.

10. The computer-implemented system according to claim 9, wherein determining the data region based on the extracted contour comprises:
- iteratively selecting two points from the extracted contour;
- calculating a slope of a connection line constructed by the two points;
- after scanning the extracted contour by one round, counting times of occurrence of each slope;
- determining a horizontal direction of the narrow-strip two-dimensional bar code based on a slope of maximum times of occurrences;
- determining four vertices of the narrow-strip two-dimensional bar code based on the center positions of the first positioning graph and the second positioning graph and the horizontal direction; and
- determining the data region based on the four vertices.

11. The computer-implemented system according to claim 10, wherein determining the four vertices of the narrow-strip two-dimensional bar code based on the center positions of the first positioning graph and the second positioning graph and the horizontal direction comprises:
- constructing a central connection line based on the center positions of the first positioning graph and the second positioning graph;
- determining an angle of the central connection line relative to the horizontal direction; and
- determining the four vertices of the narrow-strip two-dimensional bar code based on the center positions of the first positioning graph and the second positioning graph and the angle.

12. The computer-implemented system according to claim 8, wherein detecting the first positioning graph and the second positioning graph in the image comprises:
- for each of the first positioning graph and the second positioning graph, identifying, in the image, a positioning graph whose width ratio of the central square structure and the enclosure structure is 1:1.

13. The computer-implemented system according to claim 8, wherein determining, from the image and based on center positions of the first positioning graph and the second positioning graph, a target region comprises:
- determining, based on the center positions of the first positioning graph and the second positioning graph, a diagonal line of the rectangular region corresponding to the narrow-strip two-dimensional bar code; and
- determining, from the image and based on the diagonal line, the target region comprising the rectangular region.

14. The computer-implemented system according to claim 9, wherein the narrow-strip two-dimensional bar code comprises:
- the first positioning graph and the second positioning graph, wherein the first positioning graph and the second positioning graph are located at two vertices of a rectangular region;
- two isolation regions, wherein each of the two isolation regions is formed by a second plurality of blocks of the first color, in the rectangular region, surrounding one of the first positioning graph and the second positioning graph; and the data region, used to form two-dimensional bar code data and comprising a region in the rectangular region excluding the first positioning graph and the second positioning graph and the two isolation regions.

15. A non-transitory, computer-readable medium storing one or more instructions executable by a computer system to perform operations comprising:
   obtaining an image of a narrow-strip two-dimensional bar code;
   detecting a first positioning graph and a second positioning graph in the image, wherein each of the first positioning graph and the second positioning graph comprises:
      a central square structure formed by a first block of a first color, and
      an enclosure structure formed by a plurality of blocks of a second color, wherein the enclosure structure surrounds the central square structure, and
      wherein an isolation region is formed by a plurality of blocks of the first color at a periphery of each of the first positioning graph and the second positioning graph;
   after detecting the first positioning graph and the second positioning graph in the image, determining, from the image and based on center positions of the first positioning graph and the second positioning graph, a target region that comprises a rectangular region corresponding to the narrow-strip two-dimensional bar code;
   determining a data region from the target region, wherein the data region comprises a region in the rectangular region that excludes a) the first positioning graph and the second positioning graph and b) corresponding isolation regions of the first positioning graph and the second positioning graph; and
   identifying two-dimensional bar code data of the data region.

16. The non-transitory, computer-readable medium according to claim 15, wherein determining the data region from the target region comprises:
   extracting, as an extracted contour, a contour of the rectangular region from the target region based on an erode algorithm; and
   determining the data region based on the extracted contour.

17. The non-transitory, computer-readable medium according to claim 16, wherein determining the data region based on the extracted contour comprises:
   iteratively selecting two points from the extracted contour;
   calculating a slope of a connection line constructed by the two points;
   after scanning the extracted contour by one round, counting times of occurrence of each slope;
   determining a horizontal direction of the narrow-strip two-dimensional bar code based on a slope of maximum times of occurrences;
   determining four vertices of the narrow-strip two-dimensional bar code based on the center positions of the first positioning graph and the second positioning graph and the horizontal direction; and
   determining the data region based on the four vertices.

18. The non-transitory, computer-readable medium according to claim 17, wherein determining the four vertices of the narrow-strip two-dimensional bar code based on the center positions of the first positioning graph and the second positioning graph and the horizontal direction comprises:
   constructing a central connection line based on the center positions of the first positioning graph and the second positioning graph;
   determining an angle of the central connection line relative to the horizontal direction; and
   determining the four vertices of the narrow-strip two-dimensional bar code based on the center positions of the first positioning graph and the second positioning graph and the angle.

19. The non-transitory, computer-readable medium according to claim 15, wherein detecting the first positioning graph and the second positioning graph in the image comprises:
   for each of the first positioning graph and the second positioning graph, identifying, in the image, a positioning graph whose width ratio of the central square structure and the enclosure structure is 1:1.

20. The non-transitory, computer-readable medium according to claim 15, wherein determining, from the image and based on center positions of the first positioning graph and the second positioning graph, a target region comprises:
   determining, based on the center positions of the first positioning graph and the second positioning graph, a diagonal line of the rectangular region corresponding to the narrow-strip two-dimensional bar code; and
   determining, from the image and based on the diagonal line, the target region comprising the rectangular region.

* * * * *